ent [19] [11] 3,815,425
United States Patent
Skidmore [45] June 11, 1974

[54] SYSTEM FOR WHEEL BALANCING

[76] Inventor: Frank O. Skidmore, 2513 Third St., Cuyahoga Falls, Ohio 44221

[22] Filed: Oct. 24, 1972

[21] Appl. No.: 299,901

[52] U.S. Cl. .................................. 73/457, 73/459
[51] Int. Cl. ...................... G01m 1/22, G01m 1/28
[58] Field of Search ............ 73/457, 459, 466, 71.4

[56] References Cited
UNITED STATES PATENTS
| | | | |
|---|---|---|---|
| 2,344,349 | 3/1944 | Forster | 73/457 |
| 3,461,729 | 8/1969 | Haynes | 73/457 |
| 3,675,495 | 7/1972 | MacMillan | 73/466 |

Primary Examiner—James J. Gill
Attorney, Agent, or Firm—Oldham & Oldham Co.

[57] ABSTRACT

Apparatus is provided to effect a static and dynamic balance of a pneumatic tire and wheel combination in place on a vehicle or on a test stand. The technique involves measuring vibrations which occur on the mounting axle extended in at least two directions substantially 90° displaced from each other, translating the vibrations into usable information to indicate the position and the amount of weight that should be added to the tire rim combination to achieve a balancing to reduce the vibrations to below predetermined minimum requirements. The axial extension can be of variable length, but preferably in firm abutting relationship to the actual mounting axle of the wheel so that vibrations are accurately transferred to the axle extension. The wheel is spun up to a desired rotating speed to achieve the vibration measurements desired. Typical measurement systems might include a motion analyzer with magnetically attached transducers, or a unique electrical circuit combination with a strobe light to indicate the place and amount of weight necessary to achieve a proper balance.

13 Claims, 6 Drawing Figures

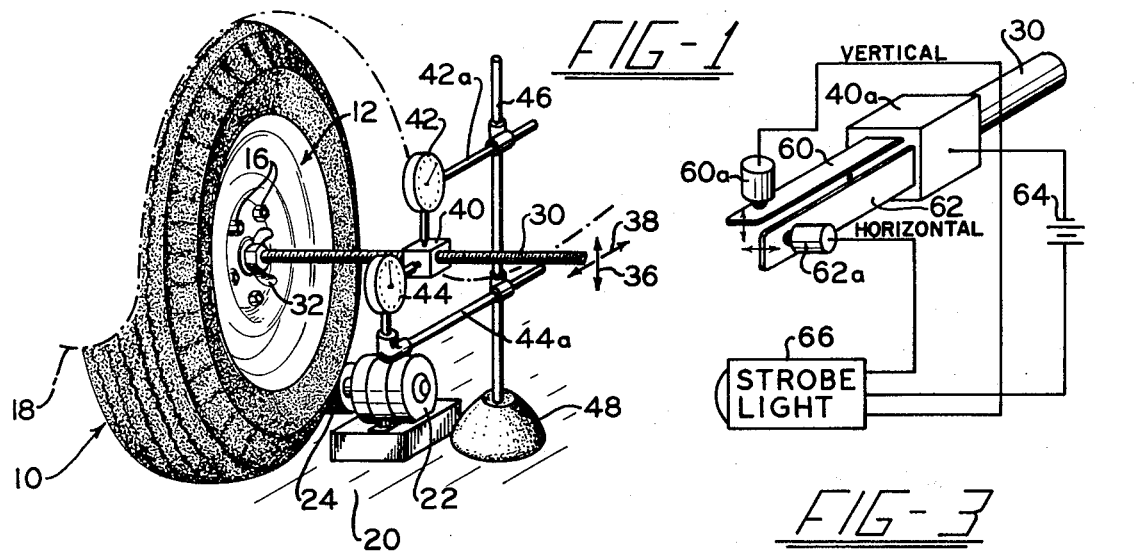
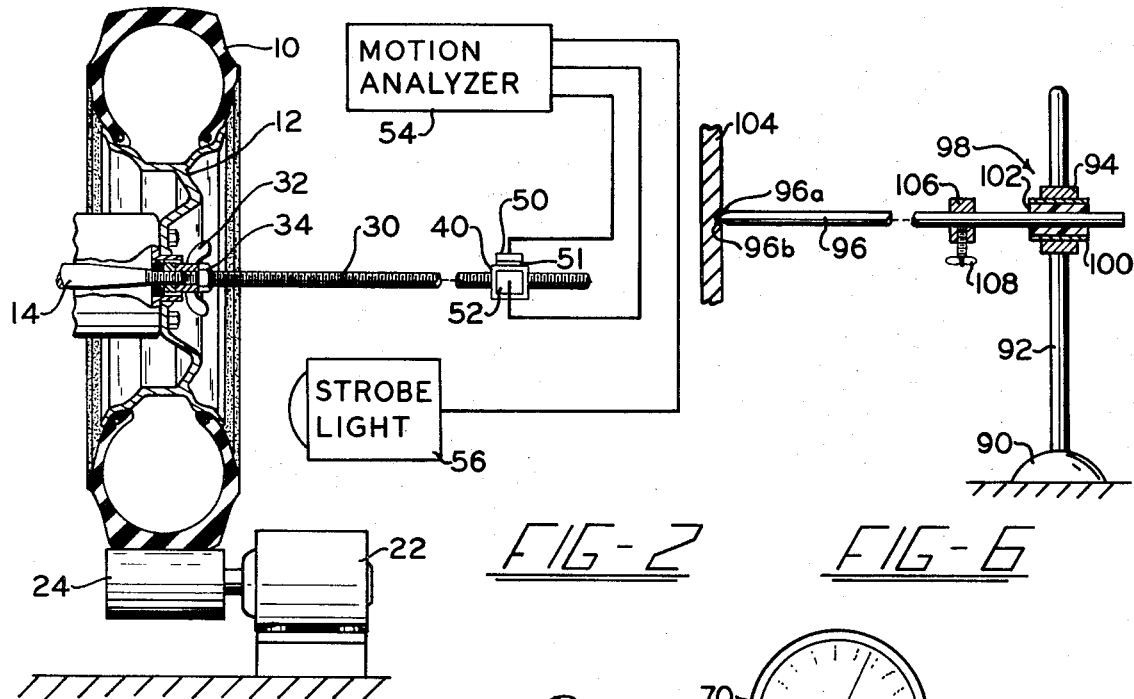
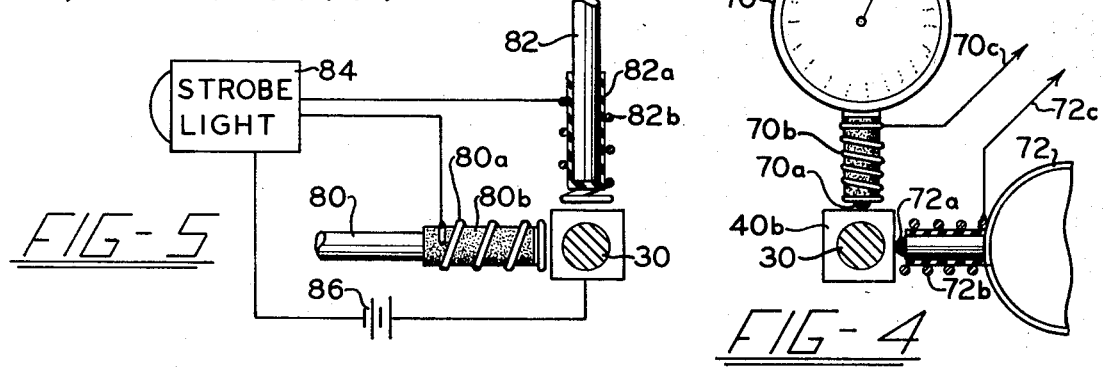

SYSTEM FOR WHEEL BALANCING

Heretofore, it has been known that there have been many and various types of automatic and spin type static and dynamic balancing apparatus. Most of these are exceedingly complicated, expensive, and sometimes unreliable. Further, these prior art systems which spin the tire on the car are not normally dynamic balancers. Further, most of these prior art devices do not effect the balancing of the tire in place under its normal mounted and operating conditions.

Therefore, it is the general object of the present invention to avoid and overcome the foregoing and other difficulties of and objections to the prior art practices by the provisions of a balancing system which is inexpensive, highly reliable, and achieves a combined static and dynamic balance in one balancing operation.

A further object of the invention is to provide a system for tire balancing which accurately determines the position and amount of weight necessary to achieve a dynamic and static balance of a pneumatic tire in its normal mounted rotating condition.

The aforesaid objects of the invention and other objects which will become apparent as the description proceeds are achieved by providing means to rotatably support a pneumatic tire and rim combination on an axle, means to mount an axle extension to the axle, means to measure vibration of the axle extension in at least two directions of substantially 90° displacement with respect to each other, and means to utilize the vibration measurement information to determine the amount and position of weight necessary to attach to the tire rim combination to counterbalance the movement of the tire and reduce the vibration of the extended axle.

For a better understanding of the invention reference should be made to the accompanying drawings wherein:

FIG. 1 is a perspective illustration of an embodiment of the invention utilizing dial indicator measurement structure;

FIG. 2 is a cross sectional illustration of the mounted wheel utilizing a modified detection structure;

FIG. 3 is a partial perspective electrical schematic illustration of a further modification to the vibration detection;

FIG. 4 is modification of the dial indicator vibration detection portion in plan view and partial electrical schematic;

FIG. 5 is a broken away plan view of a further modified structural vibration detection pick up with an electrical schematic; and FIG. 6 is a partial cross-sectional view of a modified axle extension particularly adapted for the in place balancing of the driving wheels of a vehicle.

GENERAL DESCRIPTION

With respect to the embodiment of the invention illustrated in FIG. 1 of the drawings, the numeral 10 indicates generally a pneumatic rubber tire inflated and mounted on a suitable rim 12 with the rim 12 rotatably mounted to a suitable support such as an axle 14 as seen in FIG. 2 by means of nuts 16, all in the manner normally understood by those skilled in the art. In the embodiment of FIG. 1, the tire 10 is normally still in its position on the automobile with which it is associated, with the fender of the automobile indicated by the chain dotted lines 18, and with the wheel 10 positioned off the ground 20 by a suitable lift (not shown). In this condition, the tire 10 may be rotated by a suitable wheel spinner comprising a drive motor 22 driving a spool 24, with such wheel spinners being conventionally available. If the driving wheels are to be balanced, it is not necessary to use the separate wheel spinner, as these wheels can be spun up to speed using the automobile engine driving in the usual manner.

The invention essentially comprises measuring up, down and lateral motions or vibrations of the mounted wheel. These measurements can be taken directly from the axle, or preferably by utilizing an axle extension rod 30 which is removably mounted in locked fixed relationship to and abutting with axle 14 by a wing type mounting nut 32, and lock nut 34. The mounting nut 32 normally screws over the threaded axle end when the bearing grease cap is removed on the outer side of the wheel. It should be noted in FIG. 2 that the rod 30 is held in an end to end firmly abutting relationship by nuts 32 and 34 to the stub end of axle 14. It is important to the invention that the extension rod 30 be in such abutting relationship so that vibrations of the axle 14 are properly amplified and transmitted by the rod 30, all as will be more fully explained hereinafter.

It should thus be understood that upon the spin up of wheel 10 by the spin up apparatus 22 and 24, if there is any static unbalance in the wheel 10, such unbalance will normally reflect itself in an up and down or vertical plane type vibration which will cause the extended end of rod 30 to move in the vertical direction. Similarly, if there is any dynamic unbalance in the tire 10, it will normally cause a tire wobble, or a movement in the horizontal plane which can be detected by a horizontal movement of the extended rod 30. Hence, the end of the rod 30 will normally be making a complex movement which essentially will be in the direction of the double ended vertical arrow 36 and double ended horizontal arrow 38. In order to detect these movements, a measuring surface is provided by a block 40 which is threadably received and suitably locked into position on rod 30 at whatever displacement position desired. The block 40 might instead be a slidable block locked in place by a thumb set screw such as shown in FIG. 6. The block 40 preferably has at least two measuring surfaces thereon at about 90° to each other to allow vibration measurement to be taken in both the vertical and horizontal planes.

FIG. 1 illustrates a typical way to measure the vibrations from the surfaces of block 40 which might be with appropriate dial indicators 42 and 44 which are carried on respective mounting arms 42a and 44a, with the mounting arms respectively adjustably carried by movable slides 42b and 44b on a support post 46 carried by a mounting base 48. With appropriate adjustment to zeroize and bring the dial indicators into contact with their respective surfaces of block 40, an accurate indication of the displacement or vibration of surfaces of block 40 during the spinning of tire 10 can accurately be measured.

In order to translate the vibrations of block 40 into usable signals to determine the amount and position of weight which might be added to the rim 12 to suitably statically and dynamically balance the tire rim combination, various techniques as shown in FIGS. 2 through 5 can be utilized. For example, in FIG. 2 the translation means includes a pair of transducers 50 and 52, each preferably magnetically attached to block 40 by an appropriate magnet, one of which is indicated by numeral 51 associated with transducer 50. The transducers send their signals into a motion analyzer indicated generally by block 54, with analyzer 54 in turn driving a strobe light 56. The analyzer might be for example of the type 4911 as made by B & K Instruments, Inc. of 5111 West 164th Street, Cleveland, Ohio 44142. This analyzer includes as peripheral equipment, appropriate transducers and strobe light attachments. The strobe light 56 is preferably positioned so that it will shine on that portion of the tire rim combination where a clip type or adhesively applied type lead balancing weight would normally be attached.

The perferable technique of utilizing the analyzer would be to first actuate transducer 50, for example. Signals from transducer 50 drive the strobe light, and so by observing where on the tire rim combination the flash of the strobe light occurs, the position of the weight which should be added is determined. Then by appropriate calibration of the motion analyzer, the signal from the transducer in terms of magnitude is translated into terms of ounces of lead so as to indicate the amount of lead that should be positioned at the spot located by the strobe light. The same procedure would then be followed for transducer 52 to achieve the positioning of weight for dynamic balance. It may be in some instances, however, that once the vertical transducer 50 is analyzed and corrected, that it will simultaneously reduce or substantially eliminate the vibration of the horizontal transducer 52. However, in most instances both transducers will be separately analyzed and strobed to achieve the balance eliminating the vibrations to the desired extent.

It should be equally understood by one skilled in the art that the magnitude of the vibration can be directly translated by proper calculation into an exact amount of weight needed to counterbalance the force causing the vibration or movement of the rod. Thus, in accordance with the embodiments defined hereinafter a table could be devised for particular spacing of the measuring surface from the center rotation plane of the tire-rim combination, and the size and weight characteristics of the tire and rim, which table would show the exact weight need for each increment displacement of the measuring surface, for example.

FIG. 3 illustrates a modified vibration detection system where the block 40a made from a heavy material such as metal or a dense plastic is threadably received on the rod 30. In this instance, a pair of flat springs 60 and 62 preferably tuned to a frequency or a multiple of the frequency of what would be the normal wheel vibration caused by static or dynamic unbalance for a time rotating at, for example, are firmly embedded and carried by block 40a. Spring 60 has its faces horizontal for detecting vertical vibrations and spring 62 has vertical faces for detecting horizontal vibrations. This embodiment of the invention is extremely sensitive to small vibrations as the springs will tend to vibrate actually more than the extension rod 30, which vibrations are respectively indicated by the double ended arrows.

In order to translate this vibration into useful information, a pair of adjustable electrical contacts 60a and 62a are mounted to cooperate with their respective springs and establish a complete electrical circuit through block 40a, an appropriate power source 64, and to fire the strobe light 66 whenever a particular circuit is selected and electrical contact is made by the respective spring engaging its respective contact. With the contacts 60a and 62a being adjustable in the vertical and horizontal planes, respectively, the gap between the respective springs can be selectively set so that the amount of weight which should be utilized to balance can be precisely determined. For example, I have found that with the block 40 at a distance of about 10 inches from the wheel of a normal 825 × 15 passenger tire, that each 0.020 inches movement of the springs reflects one ounce of weight necessary to achieve a balancing correction thereof. Thus, one can start at a large gap distance and gradually move it down until the strobe light is actuated, determine the gap distance, and if it were for example 40 thousandths, one would know that about 2 ounces of weight were necessary to balance at the point indicated by the strobe light. A table as referred to above would be made for each tire size and for different distance spacings of the block 40 from the rotation plane of the tire. The embodiments of FIGS. 4 and 5 operate in the same manner as the flat spring embodiment of FIG. 3 except that different actuating structure for the strobe light is utilized. Specifically, in FIG. 4 dial indicators 70 and 72 are associated with a block 40b with the pins 70a and 72a of the respective indicators contacting appropriate horizontal and vertical surfaces of block 40b. Helical coil springs 70b and 72b are mounted in insulated relationship respectively around the pins 70a and 72a, so that the pins 70a and 72a are slidable with respect thereto. An electrical connection 70c and 72c is then made with respect to each spring so that whenever the spring end comes into contact with the block, a strobe light (not shown in this embodiment) can be actuated. It is obvious because of the characterisitcs of a dial indicator, that the springs 70b and 72b can be fixed in relationship to the body of the respective dial indicators 70 and 72 and the pins 70 a and 70b simply adjusted with respect to the block 40b so that an appropriate gap can be normally set with respect thereto so that the amount of weight to be applied to the spot indicated by the strobe light can be determined in the same manner as defined with respect to the embodiment of FIG. 3 above.

FIG. 5 is designed exactly the same as FIG. 4 except the pins 80 and 82 are not associated with the dial indicators, or the like. Here, the insulating sleeves 80a and 82a, respectively which mount the helical springs 80b and 82b, respectively, are fixed to the rods 80 and 82, but the rods will normally be carried by an adjustable mounting post such as 46 in FIG. 1 and hence one can readily adjust the gap relationship of the springs with respect to block 40c. Here again the electrical connection to a strobe light 84 is actuated by appropriate electrical source 86 is included so as to determine the position and amount of weight to be added utilizing this detection source to determine the vibration characteristics from the block 40c.

FIG. 6 illustrates a base 90 supporting a post 92. The post 92 supports a mounting sleeve 94, which sleeve 94 can be vertically adjusted and locked to post 92 by a winged set-screw or the like. An axle extension rod 96 is preferably slidably mounted in a sleeve indicated generally by numeral 98. The sleeve 98 consists of a metallic outer casing 100 and a resilient inner core 102 made up of a soft rubber of the like. Hence, it should be understood that the rod 96 by its resilient mounting in core 102 is free to vibrate with respect to the post 92. The rod 96 may also be in two pieces connected together by a helical spring. The piece which contacts the wheel assembly would carry the measuring block, while the other piece would be vertically adjustable, but fixedly carried by the base.

To use this embodiment of the invention the rod 96 is preferably pointed as at 96a and is engaged in abutting relation into the centering hole 96b in the plate 104 mounting the driving wheel of a vehicle. The hole 96b is normally present having been caused by the lathe mounting when the plate was turned in manufacture thereof. Hence the hold 96b is axially aligned. No physical attachment of rod 96 to plate 104 is contemplated.

Now with a measuring block 106 slidable on rod 96, and locked by a thumb screw 108 into position, any of the measuring and strobe techniques defined above can be utilized. With this embodiment of the axle extension, the rod can engage a rotating or non-rotating surface. Therefore, the plate 104 in FIG. 6 can actually be rotatably driven by the engine of the vehicle and the spinner of FIG. 1 eliminated. The movement of the plate 104 is translated directly to rod 96. Because of the resilient mounting of rod 96, this movement is not dampened, but essentially the same movement is achieved as in the embodiments of FIGS. 1 and 2. The measurements taken from block 106 can hence be translated by any of the mechanism defined in FIGS. 2-5.

Hence, it should be understood that the objects of the invention have been achieved by utilizing an extended axle of a rotatably mounted wheel which might be on the automobile or vehicle in a jacked up position, or might be mounted to an appropriate test strand. The dynamic, radial, or lateral motion caused to the axle by the rotation of the wheel will be translated to the extended axle and through appropriate detection equipment will trigger a strobe light to indicate the position of a weight to correct the vibrating condition. An appropriate motion analyzer, or gap spacing or vibration distance measuring techniques of the circuit to actuate the strobe light will determine the amount of weight necessary to be added at the spot indicated by the strobe light. While in the embodiment of FIG. 3, only flat springs are illustrated to measure the natural vibrating frequency of the arm 30 based on the rotating speed of the wheel, naturally, coil springs, or some other resonant member which would vibrate, and with which electrical contact can be associated in the manner of FIG. 3 could be utilized. While the invention has disclosed an abutting relation of rod 30 to axle 14, the rod 30 may abut any part of the wheel mounting structure preferably axially aligned.

While in accordance with the Patent Statutes only the preferred embodiments of the invention have been illustrated in detail, it is to be particularly understood that the invention is not intended to be limited thereto or thereby, but that any concept utilizing any measurement taken from the axle or any extension thereof to measure the vibrations in a pneumatic wheel while it is rotated on the vehicle with which it is normally mounted and associated with a circuit to translate the vibrations into amount of weight, and position of weight on the tire rim combination will meet the objects of the invention. The inventive scope is defined in the appended claims.

What is claimed is:

1. Apparatus to effect balancing of a axle mounted pneumatic tire and rim combination said combination mounted so as to be rotatable with movement of the combination perpendicular to the axis of rotation limited to one plane which includes the axis of rotation, and wobble movement of the axle limited to a second plane which includes the axis of rotation substantially at 90° to said one plane, which includes
   a. means to spin the tire-rim combination at a predetermined speed,
   b. means to measure the vibration of the axle during spinning of the combination, and
   c. means to utilize the vibration measurement information to determine the amount and position of weight necessary to attach to the tire-rim combination to counterbalance the combination where the means to measure vibration includes an axle extension rod mounted in axially aligned relation to the axle and extending axially outwardly from the tire-rim combination, where the means to measure vibration measures the vibration of the extension rod in at least one of said planes of substantially 90° displacement with respect to the other.

2. Apparatus according to claim 1 where the means to measure vibration comprises a base removably attached to the rod, at least one spring substantially axially aligned attached to the base, said spring tuned to vibrate at a frequency corresponding to the number or a multiple of the number of rotation of the tire-rim combination.

3. Apparatus according to claim 1 where the means to measure vibration comprises a measuring block attached to the rod and having at least one horizontal surface and one vertical surface and separately mounted dial indicator means cooperating with said horizontal and vertical block surfaces to measure vertical and horizontal movement of said surfaces respectively.

4. Apparatus according to claim 1 where the means to measure vibration comprises a measuring block attached to the rod and having at least one horizontal surface and one vertical surface, and separately mounted electrical contact means cooperating with said horizontal and vertical block surfaces to measure vertical and horizontal movement of said surfaces respectively.

5. Apparatus according to claim 1 where the means to measure vibration comprises a measuring block attached to the rod and having at least one horizontal surface and one vertical surface, and transducer means magnetically attached to and cooperating with said horizontal and vertical block surfaces to measure vertical and horizontal movement of said surfaces respectively.

6. Apparatus according to claim 5 where the means to utilize includes a motion analyzer actuated by signals from the transducers to determine weight requirements, and a strobe light directed toward the tire-rim combination driven by the analyzer to indicate the position on the combination that the weight should be attached.

7. Apparatus according to claim 1 where the means to utilize comprises a strobe light directed toward the tire-rim combination and driven by the means to measure to indicate the position on the combination that the weight should be attached.

8. Apparatus according to claim 7 where the means to measure vibration comprises a measuring block attached to the rod and having at least one horizontal surface and one vertical surface, separately mounted electrical contact means cooperating with said horizontal and vertical block surfaces to measure vertical and horizontal movement of said surfaces respectively, and electrical power means actuated by the electrical contact means to drive the strobe light.

9. Apparatus to determine the amount and position of weight necessary to effect balancing of an axle mounted pneumatic tire and rim combination said combination mounted so as to be rotatable with movement of the combination perpendicular to the axis of rotation limited to one plane that includes the axis of rotation, and wobble movement of the axle limited to a second plane that includes the axis of rotation substantially at 90° to said one plane, which includes, rod means axially mounted to and extending outwardly from the axle to provide an axle extension, means to spin the combination, means to measure movement of the rod means in said one and second planes at a preselected axial distance from the tire-rim combination mounting to the axle, means to coordinate the movement of the rod means with relation to the rotation of the tire and rim combination to determine the circumferential position of the tire and rim combination causing the movement, and means to determine the distance of movement of the rod means in said one and second planes which distance represents weight needed to counterbalance the dynamic and static unbalance of the tire-rim combination.

10. Apparatus according to claim 9 which includes means mounting the rod means in resilient abutting non-affixed relation to the axle, said rod means having a pointed end, and said axle having a machined hole on the axis of rotation thereof receiving the pointed end of the rod means with the longitudinal axis of the rod means coincident with the axis of rotation of the tire and rim combination.

11. Apparatus according to claim 10 where the resilient mounting means for the rod is a fixed vertically directed stand, a sleeve slidably mounted on the stand, and a rubber cushion inside the sleeve through which the rod is supportably received.

12. Apparatus according to claim 10 where the means to determine the distance of movement of the rod means comprises a measuring block attached to the rod having at least one horizontal surface and one vertical surface and dial indicator means cooperating with said horizontal and vertical block surfaces to measure the vertical and horizontal movement of said surfaces respectively.

13. Apparatus according to claim 12 where said means to measure vibration is mounted to the means mounting the rod means, and includes separately mounted electrical contact means cooperating with said horizontal and vertical block surfaces, and means to control the spaced distances of said electrical contact means from said block surfaces.

* * * * *